(12) United States Patent
Chang et al.

(10) Patent No.: US 10,860,058 B2
(45) Date of Patent: Dec. 8, 2020

(54) EXPANDABLE ELECTRONIC COMPUTING SYSTEM

(71) Applicant: Talos Technology Enterprise Co., Ltd, New Taipei (TW)

(72) Inventors: Ya Ju Chang, Taoyuan (TW); Jisun Kim, New Taipei (TW)

(73) Assignee: Talos Technology Enterprise Co., Ltd, New Taipei (TW)

( * ) Notice: Subject to any disclaimer, the term of this patent is extended or adjusted under 35 U.S.C. 154(b) by 0 days.

(21) Appl. No.: 16/725,209

(22) Filed: Dec. 23, 2019

(65) Prior Publication Data

US 2020/0201389 A1    Jun. 25, 2020

(30) Foreign Application Priority Data

Dec. 25, 2018 (TW) .............................. 107147000 A

(51) Int. Cl.
*G06F 1/08* (2006.01)
*G06F 1/16* (2006.01)
*G06F 13/38* (2006.01)
*G06T 1/20* (2006.01)

(52) U.S. Cl.
CPC .......... *G06F 1/1632* (2013.01); *G06F 13/385* (2013.01); *G06T 1/20* (2013.01); *G06F 2213/0026* (2013.01)

(58) Field of Classification Search
CPC .......................................................... G06F 1/08
See application file for complete search history.

(56) References Cited

U.S. PATENT DOCUMENTS

| 6,671,756 B1* | 12/2003 | Thomas | G06F 3/023 710/220 |
| 2016/0231777 A1* | 8/2016 | Decamp | H04B 1/3827 |

* cited by examiner

*Primary Examiner* — Jerry Wu
(74) *Attorney, Agent, or Firm* — Muncy, Geissler, Olds & Lowe, P.C.

(57) ABSTRACT

An expandable electronic computing system including an electronic computing system comprising: at least at least a graphics processing unit for generating a PCI-E signal; a signal conversion unit for receiving a PCI-E signal and converting it into a USB signal; a main control unit for driving the signal conversion unit to operate; a USB interface device for receiving the USB signal transmitted by the signal conversion unit, and for transmitting the USB signal to a USB port of an external host through a USB transmission cable. Accordingly, the USB signal generated by one or more electronic computing systems can be transmitted to the external host through the USB port, thereby improving the computing ability of the external host to perform graphics processing tasks or general computing tasks.

3 Claims, 6 Drawing Sheets

EXPANDABLE ELECTRONIC COMPUTING SYSTEM

BACKGROUND OF INVENTION

(1) Field of the Invention

The present disclosure relates to an electronic computing system, more particularly to an expandable electronic computing system capable of improving the computing capability of an external host having a USB port.

(2) Brief Description of Related Art

The Thunderbolt interface is compatible with USB Type C connectors and can reach a transmission speed of 40 Gbps. As a result, current computing devices with a Thunderbolt port can communicate with an external device which also has Thunderbolt port. For example, if the external device is Thunderbolt External Graphics Enclosure, the computing device can identify the external device after the installation of the Thunderbolt driver, and determine it as an External GPU, thereby improving the graphics computing capabilities of the computing device.

However, most current computing devices with Thunderbolt ports are high-end PCs or notebooks. So when they breakdown or have failures, users must spend high costs to replace them with high-end thunderbolt supported models to continue enhancing the computing power of computing devices through the Thunderbolt interface.

Moreover, most current low-end computing devices (such as Notebooks) do not have Thunderbolt ports so that their performance cannot be improved through Thunderbolt. In this regard, although the user can remove the internally plugged wireless card adapted to the m-PCIE interface and plug in an external device (such as External Graphics Enclosure) adapted to the m-PCIE interface to enhance its graphics computing capabilities, users need to use other methods to expand the Ethernet network.

Therefore, for low-to-medium-level computing devices that do not have Thunderbolt ports, how to propose an expandable electronic computing system with low hardware installation cost and effective enhancement of the computing capability of the computing device remains a problem to be solved.

SUMMARY OF INVENTION

The object of the present disclosure is to provide an expandable electronic computing system that can improve the computing ability of an external host with a USB port and includes an electronic computing system, a first USB hub, and a second USB hub, wherein the electronic computing system comprises at least a graphics processing unit, a signal conversion unit and a main control unit.

According to the present disclosure, the graphics processing unit performs a computing operation based on a request instruction transmitted by the external host to generate a PCI-E signal. The signal conversion unit can receive the PCI-E signal and convert it into a USB signal. The main control unit can drive the signal conversion unit to operate. The USB interface device can receive the USB signal and transmit the USB signal to the USB port of the external host through a USB transmission cable. One port of the first USB hub is connected with the USB interface device, and the additional ports of the first USB hub are respectively connected to the main control unit and the signal conversion unit, wherein the first USB hub is also provided with multiple expansion ports for connecting to multiple USB peripheral devices respectively. The second USB hub is interposed between the electronic computing system, a second electronic computing system, and the external host, wherein the second USB hub is provided with a port for connecting to the USB port of the external host, and wherein the second USB hub is further provided with other ports for respectively connecting to the USB interface device of the electronic computing system and a second USB interface device of the second electronic computing system to obtain the computing resources of the graphics processing unit of each electronic computing system from the external host, thereby improving the computing ability of the external host in performing the graphics processing tasks or the general computing tasks.

DETAILED DESCRIPTION OF PREFERRED EMBODIMENTS

Figure 1:
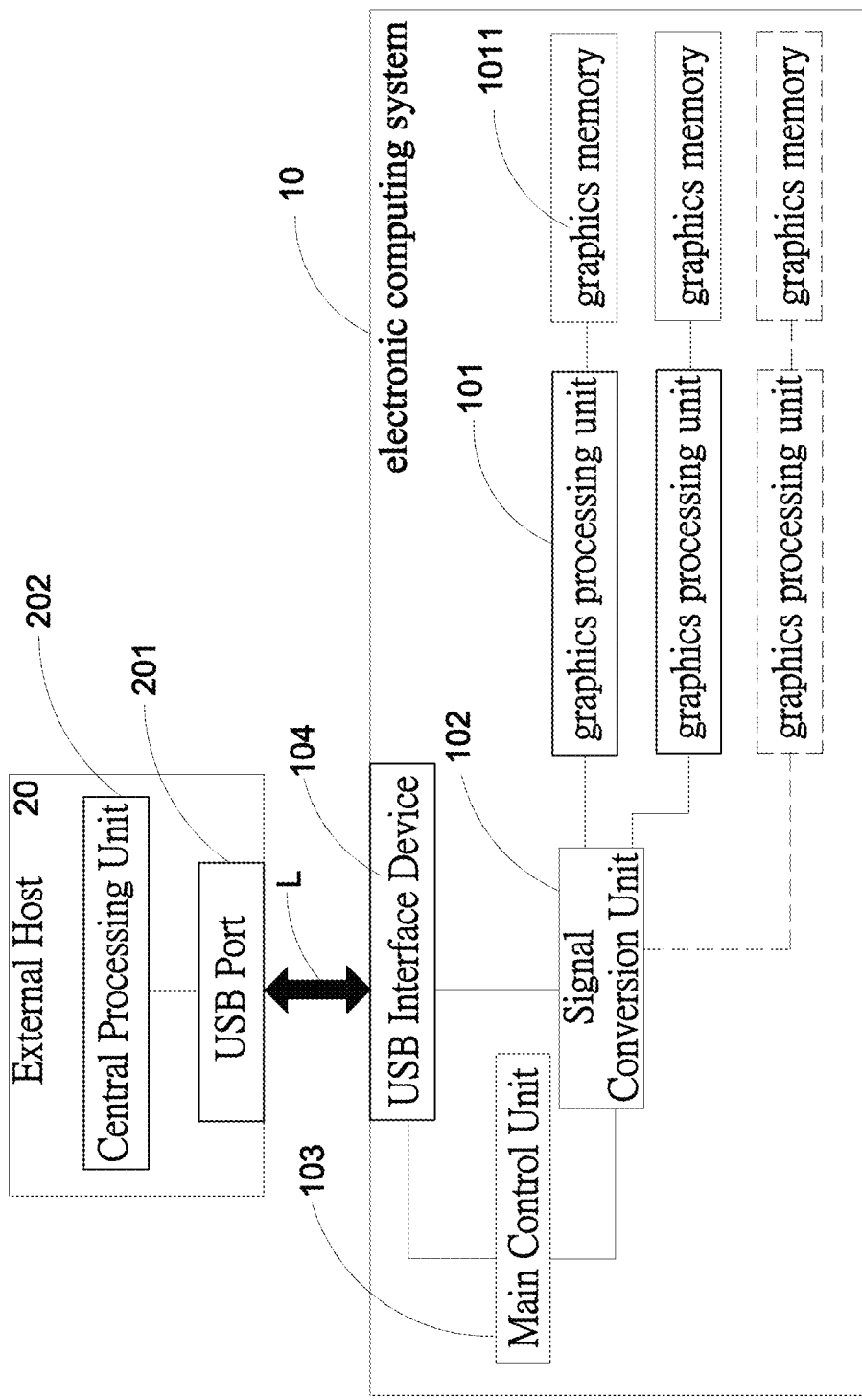
FIG. 1 is a system structure diagram of the present disclosure.
Figure 2:
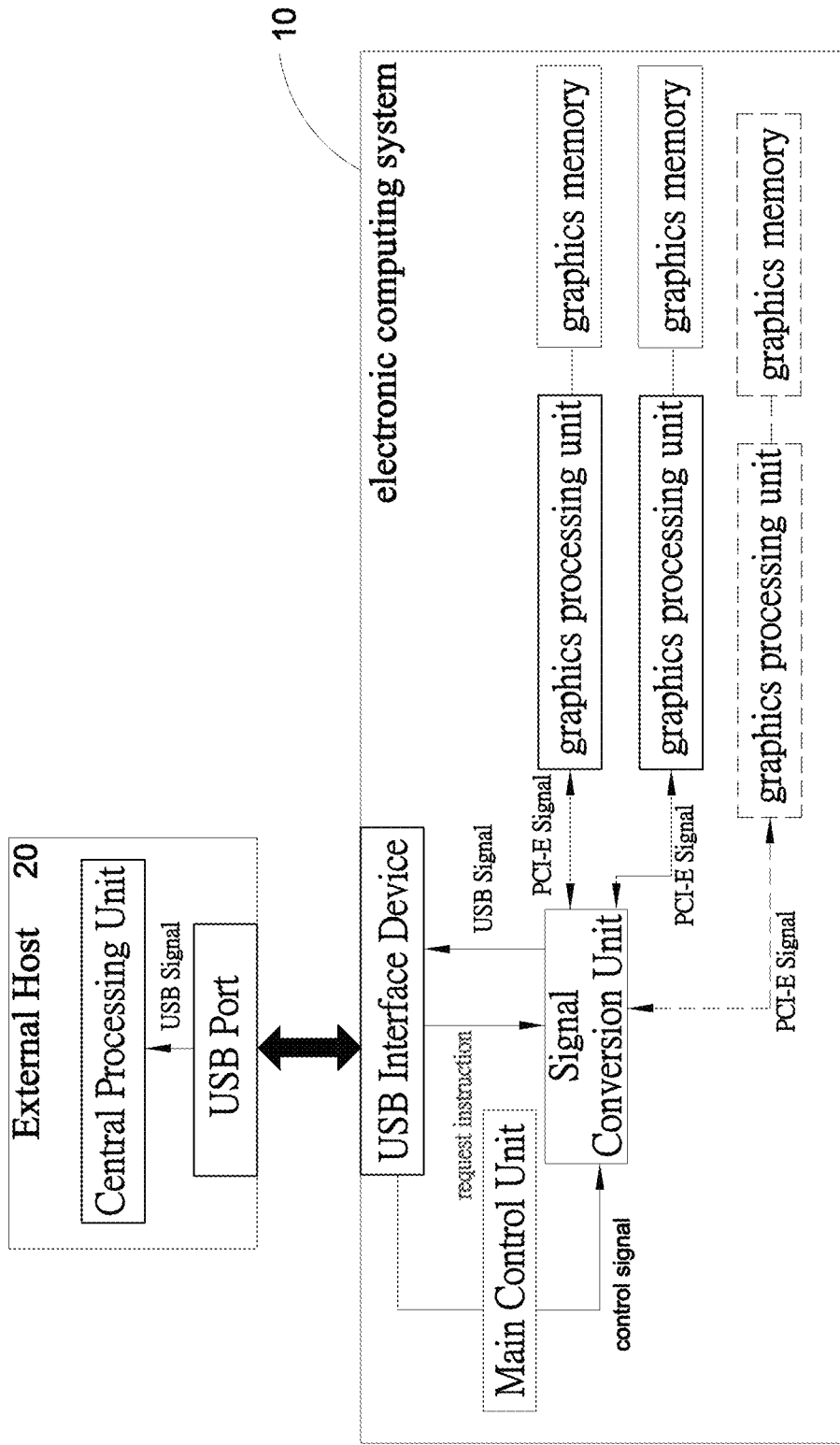
FIG. 2 is a schematic view of the signal flow of the present disclosure.

With reference to FIG. 1 and FIG. 2, an expandable electronic computing system for improving the computing ability of an external host 20 having a USB port is disclosed, wherein, the expandable electronic computing system comprises an electronic computing system 10. The electronic computing system 10 in accordance with the present disclosure can be connected to the external host 20. The electronic computing system 10 includes at least a graphics processing unit 101, a signal conversion unit 102, a main control unit 103, and a USB interface device 104.

The graphics processing unit 101 can be more than one, and each of them has a graphics memory 1011. The graphics processing unit 101 may perform a computing operation based on a request instruction transmitted by the external host 20 to generate a PCI-E (PCI Express) signal. The graphics memory 1011 is configured to temporarily store graphics instructions, request instructions, and image data. The request instruction is to perform a graphics processing task or a general computing task.

The signal conversion unit 102 is electrically connected to the graphics processing unit 101, and can receive the PCI-E signal transmitted by the graphics processing unit 101 and perform signal processing to convert it into a USB signal.

The main control unit 103 is electrically connected to the signal conversion unit 102, and mainly transmits a control signal to the signal conversion unit 102 for driving the signal conversion unit 102 to operate. The main control unit 103 may be a Microprocessor, a Microcontroller Unit, a Digital Signal Processor, an Application-Specific Integrated Circuit (ASIC), or other similar devices.

The USB interface device 104 is electrically connected to the main control unit 103 and the signal conversion unit 102, respectively, and can receive the USB signal transmitted by the signal conversion unit 102 and transmit the USB signal to a USB port 201 of the external host 20 through a USB transmission cable L. In addition, the signal conversion unit 102 can also receive a request instruction (USB signal) transmitted by the external host 20 from the USB interface device 104 to perform signal conversion and to transmit the instruction of the external host 20 requesting to read the computing resources of the graphics processing unit 101 to the graphics processing unit 101 for performing the computing operations.

The USB port 201 of the external host 20 can transmit the USB signal to a central processing unit 202 of the external host 20 for processing, so as to continue a graphics processing task or a general-purpose computing operation.

In a preferred embodiment of the present disclosure, the graphics processing task performed by the external host 20 may be a video processing or image acceleration task for 2D or 3D rendering, but is not limited thereto.

In a preferred embodiment of the present disclosure, the general-purpose computing operation performed by the external host 20 may be for the graphics processing unit 101 to run in the GPGPU (General-Purpose Computing on GPU) mode. Based on this, instructions and data that need to perform general-purpose arithmetic processing (for example, execution of Single Instruction Multiple Data of floating-point operation instructions), can be transmitted from the central processing unit 202 of the external host 20 to the graphics processing unit 101, and the arithmetic result of the graphics processing unit 101 is returned to the central processing unit 202.

In a preferred embodiment of the present disclosure, if the external host 20 is a node of a blockchain network and needs to continuously perform a hash calculation, the external host 20 can cause the graphics processing unit 101 to operate in the GPGPU mode, which can improve its hash rate on the blockchain network.

The external host 20 may be one or a combination of a PC, a notebook, a display device with a USB port, Point of Sale (POS), Head Mounted Display, but not limited thereto.

The graphics processing unit 101 can be disposed in a PCI-E interface slot, and the PCI-E interface slot can be adapted to one of the interfaces including a PCI-E ×1 interface, a PCI-E ×2 interface, a PCI-E ×4 interface, a PCI-E ×8 interface, and a PCI-E ×16 interface.

The USB interface device 104 can be adapted to the transmission specifications of the Universal Serial Bus such as USB 2.0, USB 3.0, or USB 3.1, but is not limited thereto.

In a preferred embodiment of the present disclosure, if the USB interface device 104 complies with the USB 3.0 transmission specification, the USB interface device 104 may have a power supply conductor pair (VBUS, GND), an SSTX signal conductor pair (SSTX+, SSTX−), a second USB signal conductor pair, an SSRX signal conductor pair (SSRX+, SSRX−) and a D signal conductor pair (D+, D−).

Figure 3:
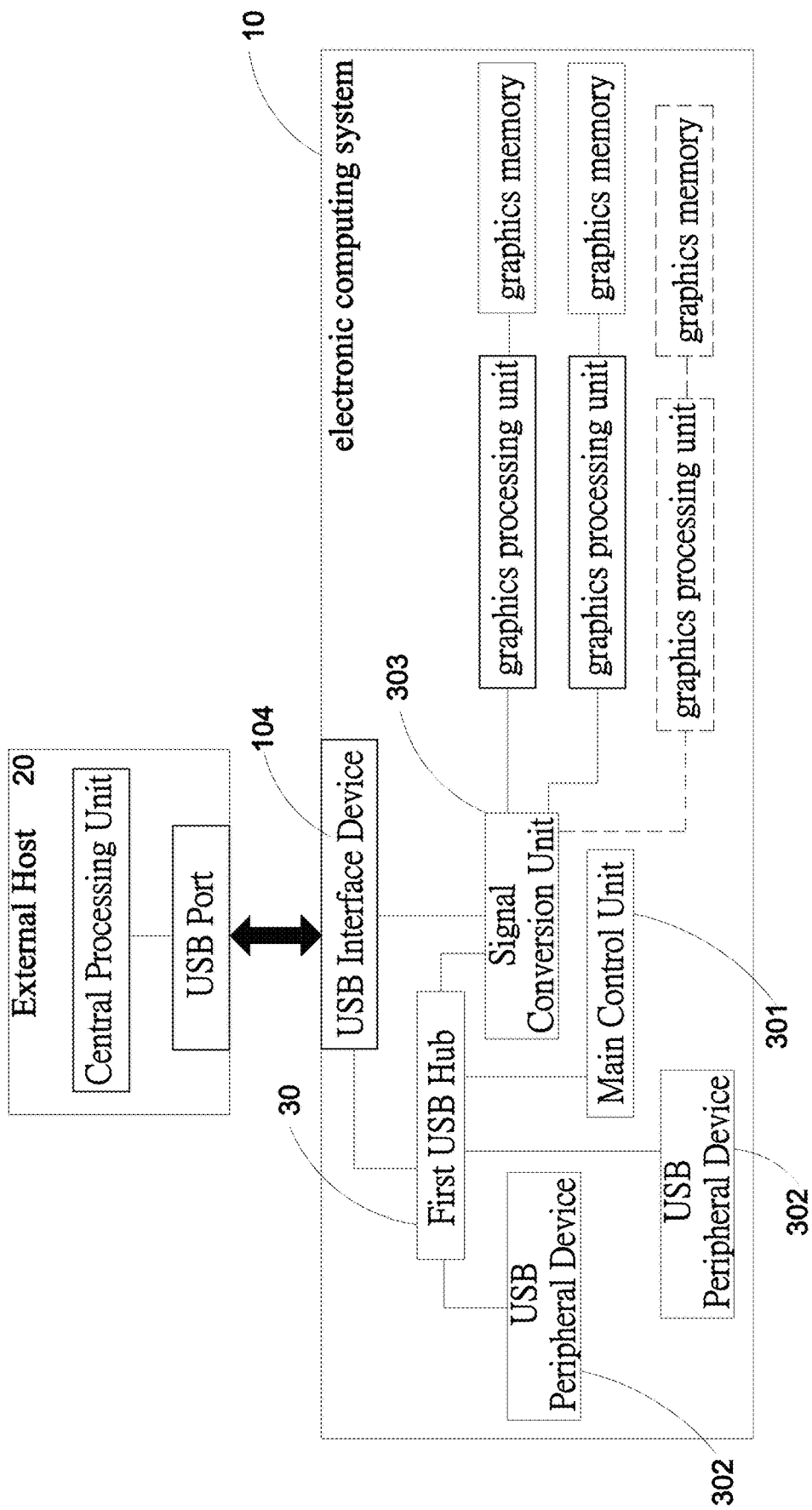
FIG. 3 is a system structure diagram of another embodiment of the present disclosure.

Referring to FIG. 3, the electronic computing system 10 in accordance with this embodiment further includes a first USB hub 30, and the first USB hub 30 may include multiple ports. One of the ports of the first USB hub 30 may be connected to the USB interface device 104. The additional (such as two or more) ports of the first USB hub 30 can be connected to a main control unit 301 and a signal conversion unit 303, respectively. Therefore, the connection relationship between the main control unit and the USB interface device 104 is different from the configuration shown in FIG. 1. Furthermore, the first USB hub 30 can be provided with multiple expansion ports to connect multiple USB peripheral devices 302 respectively.

The USB peripheral device 302 may be one or a combination of a communication device, an image sensing device, a Human Interface Device (HID) and other devices supporting a USB interface.

The communication device can establish communication with an external device, and the method of establishing communication can be achieved through transmission protocols such as Ethernet, 3G, 4G LTE, Wi-Fi, Zigbee, Bluetooth, etc., but not limited thereto.

The image sensing device is electrically connected to the main control unit 301. After the image sensing device receives an image signal, it can be transmitted by the main control unit 301 to the graphics processing unit 101 for the graphics processing unit 101 to perform graphics processing tasks.

Figure 4:
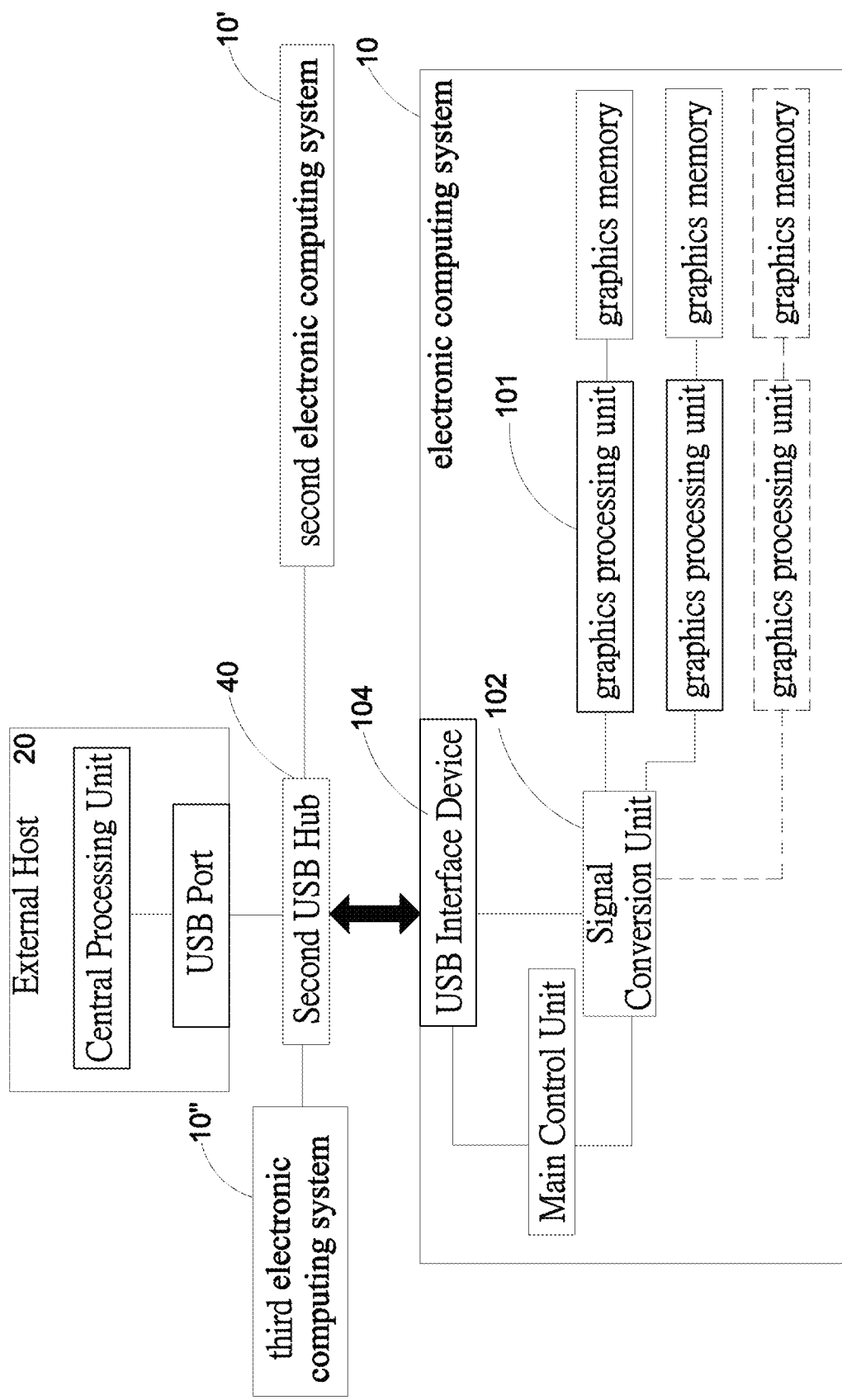
FIG. 4 is a system structure diagram of still another embodiment of the present disclosure.
Figure 5:
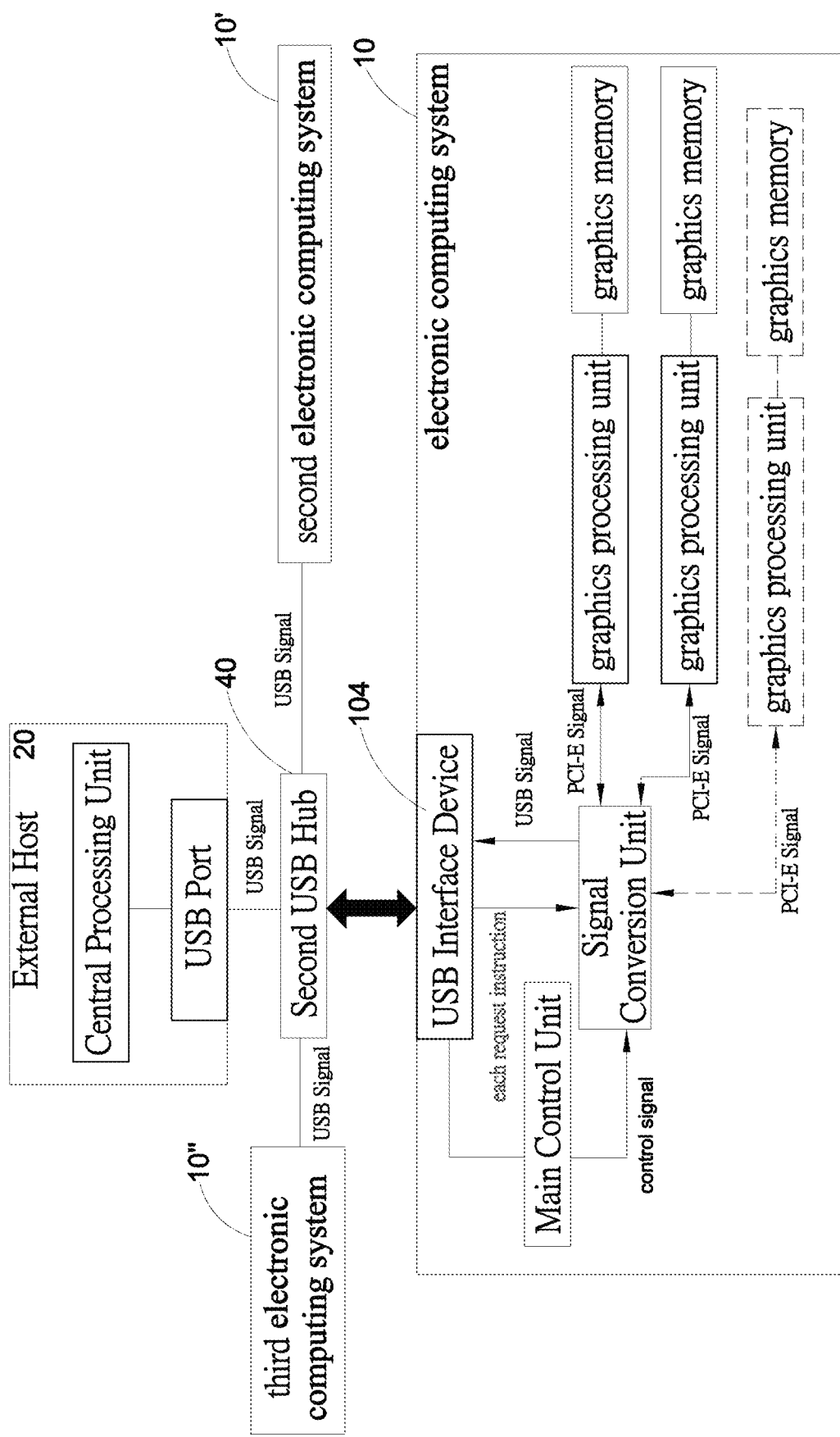
FIG. 5 is a schematic view of the signal flow according to the embodiment in FIG. 4.
Figure 6:
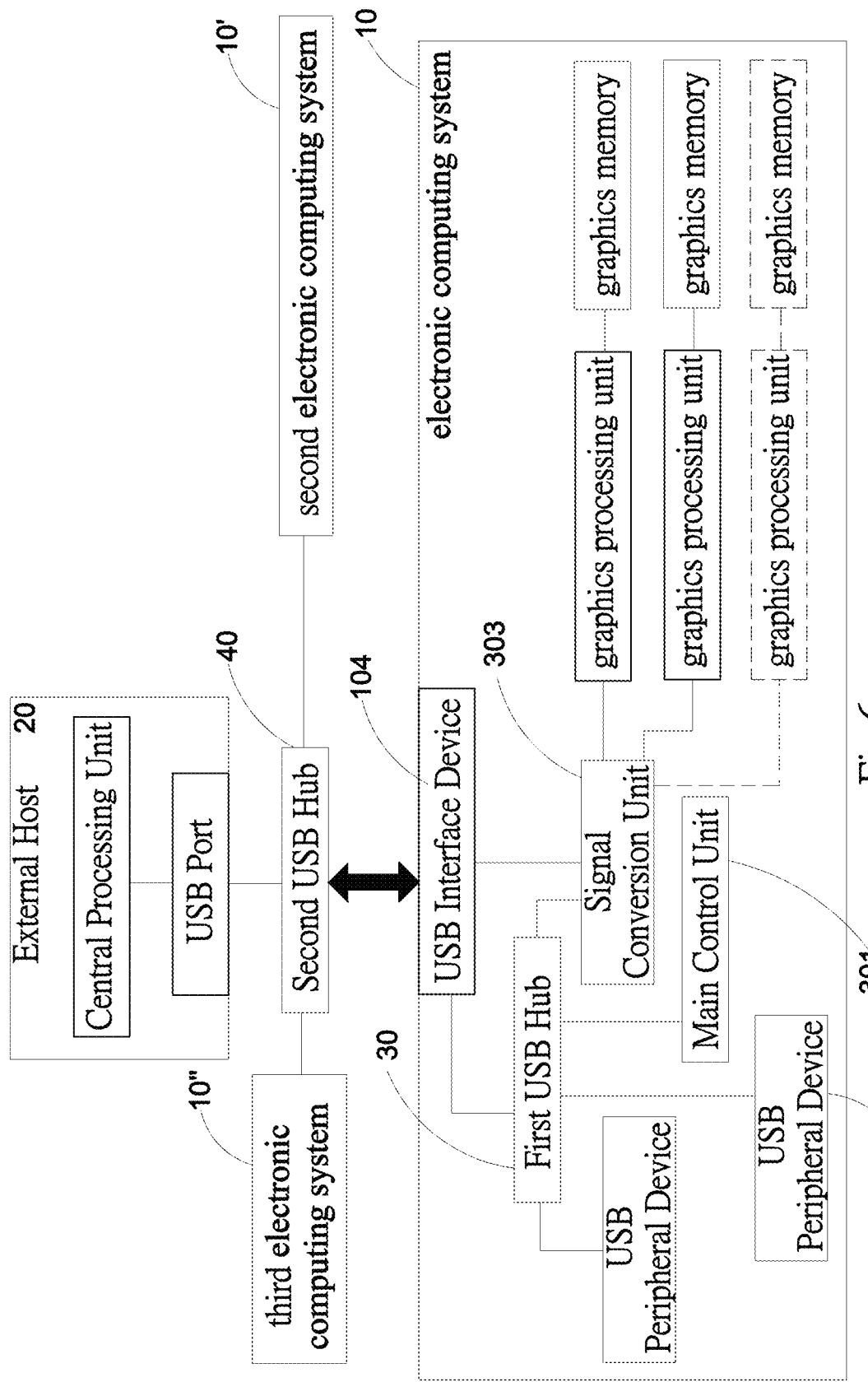
FIG. 6 is a system structure diagram of a further embodiment of the present disclosure.

Referring to FIGS. 4, 5 and 6, the electronic computing system 10 may further include a first USB hub 30. The first USB hub 30 may include multiple ports (USB connectors). One of the ports of the first USB hub 30 can be connected to the USB interface device 104. The additional (such as two or more) ports of the first USB hub 30 are respectively connected to a main control Unit 301 and a signal conversion unit 303. Moreover, the first USB hub 30 can be provided with multiple expansion ports to connect multiple USB peripheral devices 302 respectively.

Further, a second USB hub 40 can be interposed between the external host 20 and a plurality of electronic computing systems (10, 10', 10" . . . ). The system architecture and components of the other electronic computing systems (10, 10', 10" . . . ) of this embodiment are similar to those of the electronic computing system 10 of FIG. 1, and are not repeated here. The second USB hub 40 may include a plurality of ports. One of the ports of the second USB hub 40 may be connected to the USB port of the external host 20. In addition to the USB interface device 104 of the electronic computing system 10, the other ports of the second USB hub 40 may be connected to a second USB interface device of a second electronic computing system 10', a third USB interface device of a third electronic computing device 10", and so on, respectively.

Accordingly, the USB interface device of each electronic computing system (10, 10', 10" . . . ) can respectively transmit the request command transmitted by the external host 20 to the signal conversion unit for processing. After the respective graphics processing units complete the operations, the USB signals are respectively transmitted to the external host 20 to enhance the computing ability of the external host 20 in performing graphics processing tasks or general-purpose computing operations.

In addition, the second electronic computing system and the third electronic computing system (10', 10") can also include the first USB hub 30, which will not be repeated here.

The expandable electronic computing system in accordance with the present disclosure allows an external host with a USB port to connect to a USB transmission cable and complete the installation of a driver program corresponding to a graphics processing unit, and can successfully identify the graphics processing unit of one or more electronic computing systems. In this way, the computing resources can be retrieved so that the computing ability of external hosts may be enhanced to perform graphics processing tasks or general computing operations.

In particular, the present disclosure can improve the computing performance of external hosts at the application level such as Virtual Reality, Augmented Reality and Mixed Reality, hash computing, and training-machine learning models.

In short, the present disclosure allows users to effectively improve the computing ability of external hosts with lower hardware installation costs, and is particularly suitable for upgrading old computers.

Furthermore, a USB hub can be disposed inside the electronic computing system of the present disclosure to support the connection requirements of multiple USB peripheral devices, thereby achieving the expandable capacity of the electronic computing system.

Furthermore, the existing external host (such as Notebook) can effectively improve the computing capability of the external host as long as it is connected to the electronic computing system in accordance with the present disclosure, without losing the convenience of movement.

While the present disclosure has been described by preferred embodiments in conjunction with accompanying drawings, it should be understood that the embodiments and the drawings are merely for descriptive and illustrative purpose, not intended for restriction of the scope of the present disclosure. Equivalent variations and modifications performed by person skilled in the art without departing from the spirit and scope of the present disclosure should be considered to be still within the scope of the present disclosure.

What is claimed is:

1. An expandable electronic computing system for improving the computing ability of an external host, comprising: an electronic computing system including at least a graphics processing unit, a signal conversion unit, a main control unit and a USB interface device, wherein the graphics processing unit is provided having a graphics memory, the graphics processing unit is configured to perform a computing operation based on a request instruction transmitted from the external host to generate a PCI-E signal, the request instruction being given to perform a graphics processing task or a general computing task; the signal conversion unit electrically connected to the graphics processing unit for receiving the PCI-E signal transmitted by the graphics processing unit and converting it into a USB signal; the main control unit for driving the signal conversion unit to operate; the USB interface device electrically connected to the signal conversion unit, thereby receiving the USB signal transmitted by the signal conversion unit and transmitting the USB signal to a USB port of the external host through a USB transmission cable, the USB port being used for transmitting the USB signal to a central processing unit of the external host for processing, so as to improve the computing capability of the external host in performing the graphics processing task or the general-purpose computing task; a first USB hub, one port of which being connected with the USB interface device, and the additional ports of the first USB hub being respectively connected to the main control unit and the signal conversion unit, wherein the first USB hub is also provided with multiple expansion ports for connecting to multiple USB peripheral devices respectively; and a second USB hub interposed between the external host, the electronic computing system, and a second electronic computing system, wherein the second USB hub is provided with a port for connecting to the USB port of the external host, and wherein the second USB hub is further provided with other ports for respectively connecting to the USB interface device of the electronic computing system and a second USB interface device of the second electronic computing system to obtain the computing resources of the graphics processing unit of each electronic computing system from the external host; wherein each of the USB peripheral devices is selected from an image sensing device, a communication device, a HID device, or a combination thereof; and wherein the main control unit is electrically connected to an image sensing device for receiving an image signal from the image sensing device so that, after the image signal is transmitted by the main control unit to the graphics processing unit, the graphics processing unit performs the graphics processing task; the external host is capable to be configured as a node of a blockchain network and cause the graphics processing unit to switch to a GPGPU mode, therefore instructions and data that need to perform general-purpose arithmetic processing can be transmitted from a central processing unit of the external host to the graphics processing unit and arithmetic processing results are returned to the central processing unit.

2. The expandable electronic computing system according to claim 1, wherein there are two or more graphics processing units, which are electrically connected to the signal conversion unit to transmit the PCI-E signal to the signal conversion unit respectively.

3. The expandable electronic computing system according to claim 1, wherein the graphics processing unit is disposed in a PCI-E interface slot, and the PCI-E interface is selected from the group consisting of a PCI-E ×1 interface, a PCI-E ×2 interface, a PCI-E ×4 interface, a PCI-E ×8 interface, and a PCI-E ×16 interface.

* * * * *